(12) United States Patent
Ambler

(10) Patent No.: US 9,829,143 B2
(45) Date of Patent: Nov. 28, 2017

(54) COMPOSITIONS AND METHODS FOR IN-SITU MACRO-ENCAPSULATION TREATMENT OF FRIABLE ASBESTOS FIBERS GENERATED BY TRENCHLESS PIPE BURSTING OF ASBESTOS CEMENT PIPE

(71) Applicant: Edward Alan Ambler, Sanford, FL (US)

(72) Inventor: Edward Alan Ambler, Sanford, FL (US)

( * ) Notice: Subject to any disclaimer, the term of this patent is extended or adjusted under 35 U.S.C. 154(b) by 18 days.

(21) Appl. No.: 15/153,528

(22) Filed: May 12, 2016

(65) Prior Publication Data

US 2016/0334047 A1 Nov. 17, 2016

Related U.S. Application Data

(60) Provisional application No. 62/161,632, filed on May 14, 2015.

(51) Int. Cl.
| | | |
|---|---|---|
| *F16L 55/165* | (2006.01) | |
| *F16L 55/1645* | (2006.01) | |
| *B09B 3/00* | (2006.01) | |

(52) U.S. Cl.
CPC ........ *F16L 55/1658* (2013.01); *B09B 3/0066* (2013.01); *F16L 55/16455* (2013.01); *B09B 3/0025* (2013.01)

(58) Field of Classification Search
CPC . F16L 55/1658; F16L 55/165; F16L 55/1655; F16L 55/175; F16L 55/18;
(Continued)

(56) References Cited

U.S. PATENT DOCUMENTS

| | | | |
|---|---|---|---|
| 4,505,302 A | | 3/1985 | Streatfield et al. |
| 4,507,019 A | * | 3/1985 | Thompson .............. E21B 7/046 138/97 |

(Continued)

FOREIGN PATENT DOCUMENTS

| | | |
|---|---|---|
| DE | 4306618 A1 | 9/1994 |
| WO | 2004074732 A1 | 9/2004 |

OTHER PUBLICATIONS

Griffin, Jeff; "Pipebursting AC Pie Could be Problematic, says EPA": Magazine/Journal; Oct. 2009; 4 pages; vol. 10, Issue 10; Oildom Publishing Company of Texas.

(Continued)

*Primary Examiner* — Carib Oquendo
(74) *Attorney, Agent, or Firm* — Whitaker Chalk Swindle & Schwartz PLLC; Charles Gunter

(57) ABSTRACT

Equipment, process and techniques are shown for rehabilitating old underground pipelines, particularly asbestos pipelines, in which an old underground pipeline is replaced, as by drawing a bursting head through the old pipe to burst it and simultaneously pulling a new pipe through behind the bursting head. The invention has particular applicability to the rehabilitation of old asbestos pipelines in which the burst up debris must be contained or encapsulated in some manner. The macro-encapsulation materials shown form an in-situ layer of a temporarily fluid macro-encapsulating material which absorbs and immobilizes asbestos fibers and pipe fragments, the macro-encapsulating material being applied simultaneously as the pipe bursting operation proceeds.

12 Claims, 4 Drawing Sheets

(58) Field of Classification Search
CPC ............. F16L 55/1645; F16L 55/16455; F16L 55/1616; E21B 29/00; E21B 33/14
USPC .... 405/146, 150.1, 150.2, 184, 184.1, 184.3
See application file for complete search history.

(56) References Cited

U.S. PATENT DOCUMENTS

| | | |
|---|---|---|
| 4,674,914 A | 6/1987 | Wayman et al. |
| 4,930,542 A | 6/1990 | Winkle et al. |
| 4,983,071 A | 1/1991 | Fisk et al. |
| 5,076,731 A | 12/1991 | Luksch |
| 5,112,158 A | 5/1992 | McConnell |
| 5,205,671 A * | 4/1993 | Handford ................. E21B 7/30 175/62 |
| 5,482,404 A | 1/1996 | Tenbusch, II |
| 5,785,458 A | 7/1998 | Handford |
| 6,416,692 B1 | 7/2002 | Iwasaki-Higbee |
| 6,588,983 B1 | 7/2003 | Tenbusch, II |
| 6,702,520 B2 | 3/2004 | Paletta |
| 8,186,385 B2 | 5/2012 | Iwasaki-Higbee |
| 2002/0081154 A1 | 6/2002 | Herrick et al. |
| 2006/0157276 A1 | 7/2006 | Carothers et al. |
| 2013/0156507 A1 | 6/2013 | Tjader |
| 2014/0037386 A1 | 2/2014 | Tjader |
| 2014/0241812 A1 | 8/2014 | Herrick |
| 2014/0299217 A1 | 10/2014 | Grundmann |

OTHER PUBLICATIONS

Williams, Eric, et al.; "Asbestos Cement Pipe: What if it needs to be Replaced?"; 6 pages.
State of Oregon Department of Environmental Quality (DEQ); Asbestos Program; "How to Remove Nonfriable Asbestos Cement Pipe"; Article; 4 pages; Mar. 31, 2014.
Stauffer, Russell E.; "Asbestos in Soil—Who Knew?"; PowerPoint presentation; Oct. 30, 2014; 12 pages; 1st Annual Southeast Brownfields Association.

* cited by examiner

COMPOSITIONS AND METHODS FOR IN-SITU MACRO-ENCAPSULATION TREATMENT OF FRIABLE ASBESTOS FIBERS GENERATED BY TRENCHLESS PIPE BURSTING OF ASBESTOS CEMENT PIPE

CROSS REFERENCE TO RELATED APPLICATIONS

The present application claims priority from a U.S. provisional application, Ser. No. 62/161,632, filed May 14, 2015, entitled "Compositions and Methods For In-Situ Macro-Encapsulation Treatment of Friable Asbestos Fibers Generated by Trenchless Pipe Bursting of Asbestos Cement Pipe," by the same inventor.

BACKGROUND OF THE INVENTION

Field of the Invention

This invention relates generally to pipeline rehabilitation methods and techniques in which an old underground pipeline is replaced, as by drawing a bursting head through the old pipe to burst it, while simultaneously pulling a new pipe through behind the bursting head. The invention has particular applicability to the rehabilitation of old asbestos-cement pipelines in which the burst up debris must be contained or encapsulated in some manner.

Description of the Prior Art

Asbestos-cement (AC) pipe was used extensively in the mid-1900s in potable water distribution systems, particularly in the western United States. During the post-World War II era, roughly 600,000 miles of asbestos-cement (AC) pipe was laid throughout the United States and Canada. These pipes—many of them up to 70 years old—have approached the end of their lifecycle and are corroding, cracking and breaking. The Chrysotile Institute estimates AC pipe lifespan at 70 years, but actual service life depends largely on pipe condition and working environment. Because thousands of miles of AC pipe installed in distribution systems in the U.S. is nearing the end of its useful service life, AC pipe condition assessment and strategic replacement planning, and project replacement implementation is necessary. Over time, AC pipe undergoes gradual degradation in the form of corrosion (i.e., internal calcium leaching due to conveyed water and/or external leaching due to groundwater). Such leaching leads to reduction in effective structural wall thickness and cross-section, which results in pipe softening and loss of mechanical strength. Accordingly, as the water distribution system ages, the number of AC pipe failures increases with time.

AC pipes were installed in the 1940s, 1950s and 1960s when asbestos cement was valued for its strength, durability and ease of use. In the 1970s, it was determined that asbestos was hazardous to humans who inhaled its fibers over long periods. The news media widely reported on the topic, showing footage of people in hazmat suits removing asbestos-containing materials from hospitals, offices, schools and other buildings. The U.S. Environmental Protection Agency (EPA) began regulating asbestos and limited its use. All of this contributed to a general unease among the public about the mineral, which has translated into a sense of unease by regulators about AC pipe replacement. This has complicated the issue of AC pipe renewal, even though science and common sense make it clear that AC replacement is safe when proper methods are employed and precautions taken. Still, regulatory bodies at the federal, state and local levels don't agree on how AC pipes can safely be replaced, EPA has deemed it safe to replace them, and has even said that the popular pipe-bursting method is permissible, but stops short of providing specific guidance on treating broken pieces of old AC pipe, which are considered a regulated asbestos-containing material (RAM) that is subject to National Emissions Standards for Hazardous Air Pollutants (NESHAP).

A survey conducted by the American Water Works Association (AWWA) in 2004 found that, on average, AC pipes constitute approximately 15-18 percent of the USA's water distribution and transmission systems. More detailed research indicates:

AC pipes comprised from 50-80% of typical storm drain systems in the western U. S. and Canada;

AC water transmission and distribution systems included a mileage range of 40-75% ACP in some USA cities;

AC pipe sewer systems include 10-25% AC pipe (mostly in force mains) in the USA.

The EPA has addressed replacement of AC pipe using, the pipe bursting method. In an advisory letter issued Jul. 17, 1991, the EPA stated its position that "the crushing of asbestos cement pipe with mechanical equipment would cause this material to become 'regulated asbestos containing material' (RACM)" and " . . . the crushed asbestos cement pipe in place would cause these locations to be considered active waste disposal sites and therefore, subject to the requirements of §61.154 (NESHAP)." In this same letter, the EPA goes on to advise that "In order to avoid the creation of a waste disposal site which is subject to the Asbestos NESHAP, the owners or operators of the pipe may want to consider other options for dealing with the abandoned pipe." Since the EPA's letter did not specifically identify pipe bursting, interpretation of the intent is inconsistent throughout the industry.

Pipe bursting is a controlled process that takes place 3 to 5 ft. or more underground. It involves inserting a cone-shaped expander into the existing pipe to break it while simultaneously pulling through the new pipe in its place. As the new pipe enters, the old pipe crumbles gently and remains impacted in wet soil where it is contained and harmless. In addition to being a safe method of replacement, it's also one of the most cost-effective methods. City and urban residents like it because it can be done quickly with minimal disruption to the community and the environment. Pipe bursting is safe, because it all occurs underground where the pipe segments and debris can be confined.

The majority of pipe bursting done in the United States is done with pneumatic and static bursting tools. During pneumatic pipe bursting, the pipe bursting tool is guided through the deteriorated asbestos cement host pipe by a constant tension winch. As the tool travels through the pipe, its percussive action effectively breaks apart the old pipe and radially displaces and embeds the fragments into the surrounding native soil. Depending on the specific situation, the tool is equipped with an expander that radially displaces the host pipe fragments and makes room for the new pipe. During static pipe bursting, a larger tensile force is applied to the expander too via a pulling rod assembly or cable inserted through the existing pipe. The expander tool transfers the horizontal pulling force into a radial force—breaking the existing pipe and expanding the cavity. As the tool makes its way through the host pipe, it simultaneously pulls in the new pipe, usually HDPE or PVC or ductile-iron. Pipe bursting has the ability to leave an enlarged 'hole' for the trenchless installed pipe, thus providing an annular space between the expanded AC pipe, and its replacement pipe.

In the more detailed description of the invention which follows, pipe bursting is used as an exemplary technique for accomplishing the purposes of the invention. However, it will be understood by those skilled in the relevant arts that other techniques in addition to pipe bursting, such as pipe slitting or splitting or pipe fracturing may be employed, as well.

SUMMARY OF THE INVENTION

In the present invention, a method is shown for macro-encapsulating friable and non-friable asbestos fibers generated from asbestos cement pipe during a pipeline rehabilitation process, typically a static or pneumatic pipe bursting operation, as these terms are used in the industry. In the method of the invention, an in-situ layer of a temporarily fluid macro-encapsulating material is formed which absorbs and immobilizes asbestos fibers and pipe fragments. Preferably, the macro-encapsulating material is applied simultaneously as the pipe bursting operation proceeds, as by pumping the initially liquid material out through nozzles located in the vicinity of the pipe bursting head. The action of shock and vibration of the pipe bursting process forces liquefaction of the exposed soil into the temporarily fluid macro-encapsulation material, thereby creating a continuous bonded mass of macro-encapsulation material, pipe fragments and asbestos fibers which are co-bonded with a thin layer of soil.

In one aspect of the invention, the macro-encapsulation material forms a layer around new pipe being laid in the pipe bursting operation, whereby the macro-encapsulating material envelops the asbestos pipe fragments and fibers which are generated during the pipe bursting operation and co-mingles with exposed native soil and solidifies, thus preventing fibers from becoming air-borne in the event of re-excavation. In this form of the invention, the fibers are encapsulated in solid form.

In another aspect of the invention, the macro-encapsulation material which forms a layer around new pipe being laid in the pipe bursting operation envelops the asbestos pipe fragments and fibers and co-mingles with exposed native soil while remaining a high viscosity resulting in a wet gelatinous or leathery form, thus preventing fibers from becoming air-borne in the event of re-excavation. In this form of the invention, the fibers are encapsulated in "wet" form.

The macro-encapsulation material may include separately or together ingredients selected from the group consisting of water, cements, plasters, bentonite, reactive polymers or polymer mixtures, foams, surfactants, wetting agents bonding agents, foaming agents, minerals, or chemicals which chemically react with asbestos fibers to destroy them and other such elements mixtures or compounds which work to absorb and bind together soil and fragmented asbestos pipe debris.

The macro-encapsulation mixture can thus be varied by the selection of the ingredients used, as well as controlling the viscosity and density of the mixture to achieve macro-encapsulation. The particular macro-encapsulation compounds used are adjustable by formulation alterations to obtain penetration into, and solidification with, differing soils types around AC pipe in various geographical locations across the USA and the world globe. The macro-encapsulation compound physical properties are adjustable to provide targeted viscosity, to provide soil penetration into various soil types, to minimize solids segregation by pressure filtration, to minimize dilution and/or segregation by subterranean water, and, to regulate the compound set-time for the in-situ situation.

In a further aspect of the invention, the preferred method provides for color identification of the combined soil/encapsulation material, signifying AC pipe fragments and fibers within, if the site is uncovered.

Additional objects, features and advantages will be apparent in the written description which follows.

DETAILED DESCRIPTION OF THE INVENTION

Figure 1:
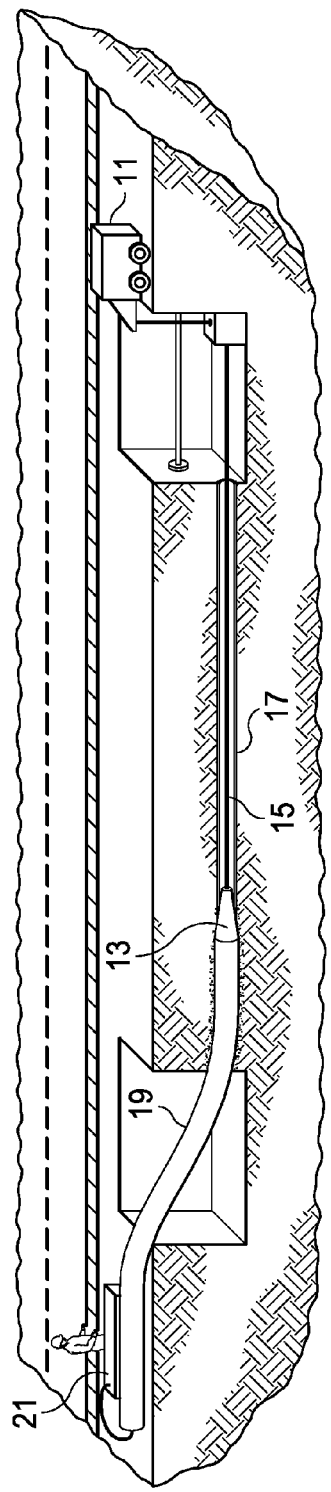
FIG. 1 is a simplified, schematic view of the equipment used for a pneumatic pipe bursting operation.

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

The U.S. Environmental Protection Agency (EPA) makes the following distinction in regulating asbestos containing materials (ACM) under the National Emission Standards for Hazardous Air Pollutants (NESHAP):

The EPA calls the more dangerous type of ACM "friable." Friable asbestos-containing materials were officially defined as: materials containing more than 1% asbestos which could be crumbled, pulverized or reduced to powder by hand pressure when dry, using methods specified in the NESHAP rules;

The EPA called "non-friable" the generally less dangerous form of ACM, not very likely to release asbestos fibers into the air. A non-friable ACM is a material containing more than 1% asbestos but not able to be crumbled, pulverized or reduced to powder by hand pressure when dry, using the methods specified in NESHAP rules.

In the description which follows, a novel macro-encapsulation treatment will be described which addresses the various issues identified above with regard to replacing existing asbestos pipelines. In the technique of the invention, the annular space, between the new replacement pipe and the expanded old asbestos cement pipe is filled with a pumpable liquid mixture which migrates around the fractured asbestos pipe fragments and further into a layer of native soil enveloping the pipe fragments, such that fluid mixture 'wets' and absorbs any and all 'friable' asbestos fibers resulting from the pipe-bursting process, thus converting the fibers to a 'non-friable' condition.

Additionally, the vibration and movement of the static and the pneumatic pipe bursting head promotes soil 'liquifaction' and emulsification of the annular liquid mixture into and with the native soil, becoming 'one' around all friable asbestos fibers and AC pipe wall chunks. This co-combined layer encapsulates the friable AC fibers. The entire host pipe and annular substance and some further circumferential layer of native soil co-combine, forming the macro-encapsulation and treatment of the AC pipe and all asbestos friable fibers.

The pumpable annular fluid substance can be a mixture of ingredients to form a fluid which will be referred to herein as the "macro-encapsulation mixture, or simply as the MEM. Without wishing to be limited to any particular formulation, this MEM can be made to varying parameters and characteristics, but two of the most significant are as follows:

One formulation consists of a mixture of ingredients which contain as a minimum: cements, wetting agents, surfactants, polymeric additives, and other components necessary to absorb and encapsulate 'friable asbestos' fiber, as well as to migrate slightly into surrounding native soil, and which mixture slowly cures and solidifies into a stable, structural mass embedded with the native soil, effectively creating a new in-situ cast-in-place circumferential layer in contact with the outside diameter of the new replacement pipe.

An alternate formulation consist of a mixture of ingredients which consists of as a minimum: gelling compounds, water, hydrophobic or hygroscopic and hydrophilic agents, wetting agents, surfactants, and other substances which together emulsify with all friable asbestos fibers and some native soil, so as to make all asbestos fibers 'non-friable' by its constantly 'wet' nature. This mixture remains 'wet, and can slowly become 'leathery' in character.

Properties important to this proprietary macro-encapsulation treatment compound, derived from its chemical formulation, include suitable initial viscosity and flow properties, specific gravity and density, stability, emulsification and dispersion capacity, PH control, environmental acceptability, coloration dye or pigmentation, and congealing and solidification within 24 to 48 hours into a diggable 'soil', using water intensively mixed with the pre-mixed dry powder formulation as the solvent slurry carrier to suspend and/or dissolve solids, inorganic and organic additives. Additional characteristics of the macro-encapsulation fluid medium are plastic viscosity (the internal resistance to dynamic flow), yield point (internal initial resistance to initial flow moving from static to dynamic), and gel-strength (reflects the electrical ionic attractive forces within the fluid under static conditions).

As can be appreciated by those knowledgeable and skilled in the art of encapsulation compound formulation, one macro-encapsulation recipe is typically not universal for all installations in differing soils of varying soil chemistry and composition, including organic soils, sands, silts, clays, fine grained, course grained, gravels, cobbles and mixtures of all of the above. To this end, it is recognized that there is a need to adjust the baseline formulation, as required by field soil conditions, by the addition of appropriate salts, wetting agents, flow modifiers, primary and secondary emulsifiers to enhance fluid stability, dispersants to assist adsorption into the water carrier, certain polymers or co-polymers or bio-polymers, viscosity modifiers, possible gellants, and inorganic chemicals to adjust PH and achieve specific ion concentrations, and, other such suitable compounds that can be used will be apparent to those of skill in the art and are considered to be within the scope of the invention.

The baseline formulation for the macro-encapsulation fluid is 55% +/−3% w/w water and 45%, +/−3% w/w of a dry powder encapsulation mixture.

Table I below lists the baseline formulation of the dry powder ingredients, comprising the encapsulation compound commercially available as "EncapsulAC™", manufactured by Boyd Tech, Inc., Spring, Tex., The EncapsulAC™ dry powder formulation is supplied as a dry bagged powder, or shipped to the job-site in larger bulk-powder tanks, trucks, or super-sacks. The powder is typically produced and/or ground to a nominal sieve size distribution in the 20 um to 100 um diameter range, with a surface area range of about 20 to 100 square meters per gram.

TABLE I

| Powder Compound 1 (calcined composition) | | 10 lbs/100 lbs |
|---|---|---|
| Silicon dioxide - | $SiO_2$ | 25% w/w |
| Aluminum Tri-oxide | $Al_2O_3$ | 3.2% w/w |
| Iron Oxide | $Fe_2O_3$ | 6.9% w/w |
| Calcium Oxide | $CaO$ | 62.6% w/w |
| Manganese Oxide | $MgO$ | 1% w/w |
| Sulphur Tri-Oxide | $SO_3$ | 1.2% w/w |
| Inert Trace compounds | — | 0.1% w/w |
| Powder Compound 2 Fly Ash - Kiln Dust | | 29.25 lbs/100 lbs |
| Powder Compound 3 Calcium Sulfoaluminate (CSA) | | 5 lbs/100 lbs |
| Powder Polymer Compounds 4 & 5 | | |
| Methoxide-N-methylamphetamine | | 5 lbs/100 lbs |
| Methylcellulose | | 5 lbs/100 lbs |
| Powder Compound 6 | | |
| Impure (Al Fe1.67 Mgo.33)Si4O10(OH)2Na+Ca++ | | 44.5 lbs/100 lbs |
| Montmorillonite | | |
| 1. | $SiO_2$ | 66.% |
| 2. | $AlO_3$ | 21.5% |
| 3. | $FeO_3$ | 4.25% |
| 4. | $MgO$ | 2.86% |
| 5. | $CaO$ | 1.5% |
| 6. | $Na_2O$ | 2.5% |
| 7. | $K_2O$ | 0.5% |
| 8. | $TiO_2$ | 0.18% |
| 9. | $P_2O_3$ | 0.06% |
| 10. | C | 0.35% |
| 11. | S | 0.35% |
| Powder Compound 7 Methacrylic Acid (MMA) | | 0.5 lbs/100 lbs. |
| Powder Compound 8 Blue dye/pigment | | 0.75 lbs/100 lbs |
| Total: | | 100 lbs/100 lbs |

After the pumping installation was complete, within 24 to 48 hours of static rest, the damp macro-encapsulation slurry self-congeals and solidifies into a diggable blue mass, combining with the bore-hole soil surfaces and encapsulating the asbestos cement fragments, and embedding the new pipeline. The characteristic blue color identifies the work zone. If the work zone material is dug up, it is colored blue for immediate identification and proper disposal. All of the ingredients used in the example formulations are environmentally acceptable. The self-congealing to low strength blue compound remains damp and diggable in the moist ground.

It will be appreciated that the density and viscosity of the MEM can be specified and controlled so the soil and pipe fragments may be made to 'float' or "sink" (analogous to a steel bar floating on liquid mercury; or a steel bar sinking in liquid water) as desired or required prior to curing or solidification of the MEM.

This macro-encapsulation treatment immobilizes all friable asbestos fibers, and solves the problem for literal and regulatory use of pipe bursting to rehabilitate asbestos cement pipelines. Pipe bursting is safe, because it all occurs underground where pipe segments are confined by wet soil and becomes enveloped by the wet macro-encapsulation layer containing wetting agents, hygroscopic-agents, surfactants and solidification or gelling compounds.

FIG. 1 shows, in simplified fashion, a typical pneumatic pipe bursting operation in which a winch 11 pulls an expander head 13 by means of the winch rope 15 through the existing underground AC pipeline 17 while an internally mounted "air-hammer" assists the winch rope's pull-force to drive the metal expander head forward in the direction of the pull. The new pipeline 19 is fed from a work station 21 and simultaneously pulled behind the expander head 13. A compressor can be used to supply and dispense the liquid macro-encapsulation mixture (MEM) of the invention through the expander assembly.

Figure 2:
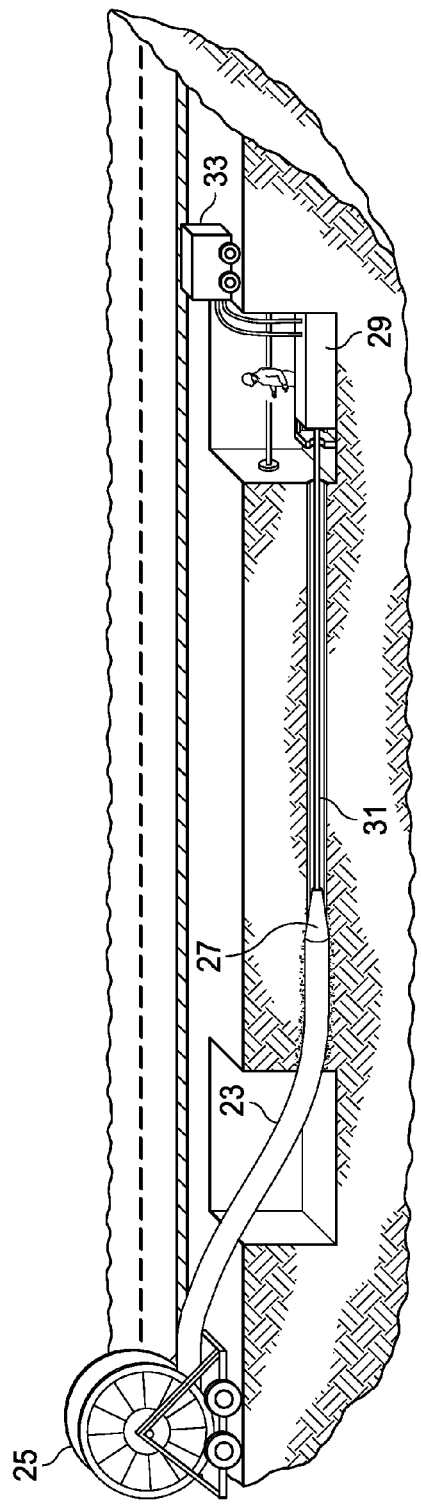
FIG. 2 is a similar simplified, schematic view of the equipment used for static tension pulling of the assembled pipe-bursting head-distribution ring and new pipe assembly.

FIG. 2 is a similar view to FIG. 1, but showing a static pipe bursting operation. In this operation, new pipe 23 is pulled from a storage reel or above ground fused pipeline 25 and pulled behind a burst head 27. The burst head is intermittently pulled forward from an operator location 29 by connecting bursting rods 31. The operation is powered by a hydraulic unit 33.

Figure 3:
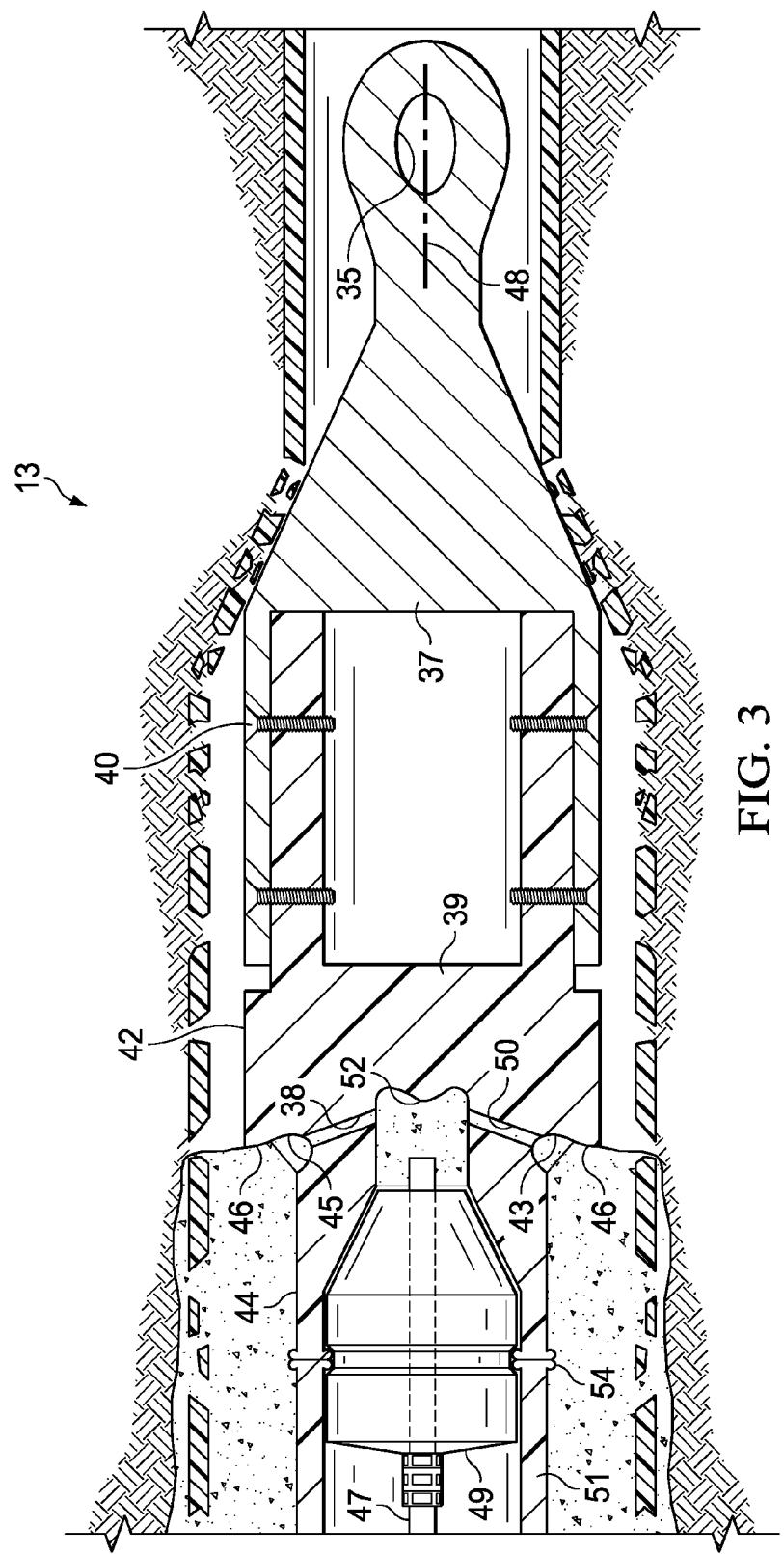
FIG. 3 is a side, partial sectional view of a bursting and distribution head useful in the practice of the present invention.

FIG. 3 shows one type of macro-encapsulation distribution head 13 which can be used in the practice of the invention. The eyelet 35 is used as an attachment point for the winch rope (15 in FIG. 1). The metallic pipe bursting head 37 is attached to the eyelet. The pipe bursting head is typically a solid metal cone. The bursting head 37 is attached to an HDPE pull-head 39, as by anchor members 40 (bolts, pins or screws). The pull-head 39 has a first generally cylindrical outer diameter 42 along a portion of a mid-region thereof. The first generally cylindrical outer diameter 42 is joined to a second region having a generally cylindrical outer diameter 44 by a slanted wall region 46. The region 44 is of lesser outer diameter than the region 42. The slanted wall region 46 forms a negative acute angle with respect to the outer diameter 42 and a longitudinal center line 48 of the pipe bursting assembly.

The slanted wall region 46 extends in the direction of a first distribution port 45 which extends outwardly from a slanted distribution channel 38 and from a micro-encapsulant internal distribution shoulder 52 formed in an internal recess in the HDPE pull-head. A mirror-image second slanted wall region 46, distribution port 43 and distribution channel 50 extend outwardly opposite the centerline 48.

Standard pipe bursting technology traditionally uses a single distribution port to apply a slimy lubricant, typically a polymer. Sometimes the slime polymer lubricant is 'split' into two streams on larger diameter pipes. Just one or two delivery ports cannot supply 360 degree circumferential lubricant application, so its function is impaired. In the case of the present invention, multiple exit ports (such as ports 43, 45 in FIG. 3) are provided around the perimeter of the distribution head and pipe to enable full circumferential encapsulation of liquids to the surface of the plastic pipe being installed. The encapsulating fluid employing various kinds, chemistry, substance, and viscosity inherently provides a fluid-bearing layer along which the inserted plastic pipe will slide with reduced friction. The device and process of the invention provide full encirclement of fluid around the insertion pipe (plastic or metal), delivered through three or more distribution ports more or less equally spaced around the circumference of the pull-head assembly. For example, there could be 3-6, or even a greater number, depending upon such factors as the diameter of the pipe being burst.

In operation, the liquid MEM is supplied, in this case through a hose 47, to the internal recess (as through packer 49). The hose 47 in FIG. 3 is generally aligned with the longitudinal axis 48 of the assembly. The liquid MEM strikes the shoulder 52 and the adjacent outwardly slanting regions and is dispensed outwardly into the surrounding annular space through the distribution ports 43, 45, where it acts to encapsulate the asbestos cement pipe debris. The pull head generally cylindrical region 42 adjacent the ports 43, 45 forms a protective lip or shoulder with respect to the distribution ports and distribution channels, so that soil and debris cannot radially access and plug the distribution ports or distribution channels. The pull head 39, as shown in FIG. 3, has attached the replacement length of plastic pipe 51 which has been attached, as by butt-fusing, at a joint 54, the replacement pipe being pulled into position simultaneously with the pipe bursting operation and dispensing of the MEM.

The plastic pipe pull head and metal burst head assembly of the invention can also optionally have a forward flowable fill feed-port or ports, so as to pre-fill the host pipe interior prior to pipe bursting, such that upon rupture and fragmentation, the fragments are 'pre-wetted' by the forward flowable fill, and as the fragments and pre-fill are radially expanded, all surfaces are wetted in addition to the action by the radial injection pressure at the distribution head.

Figure 4:
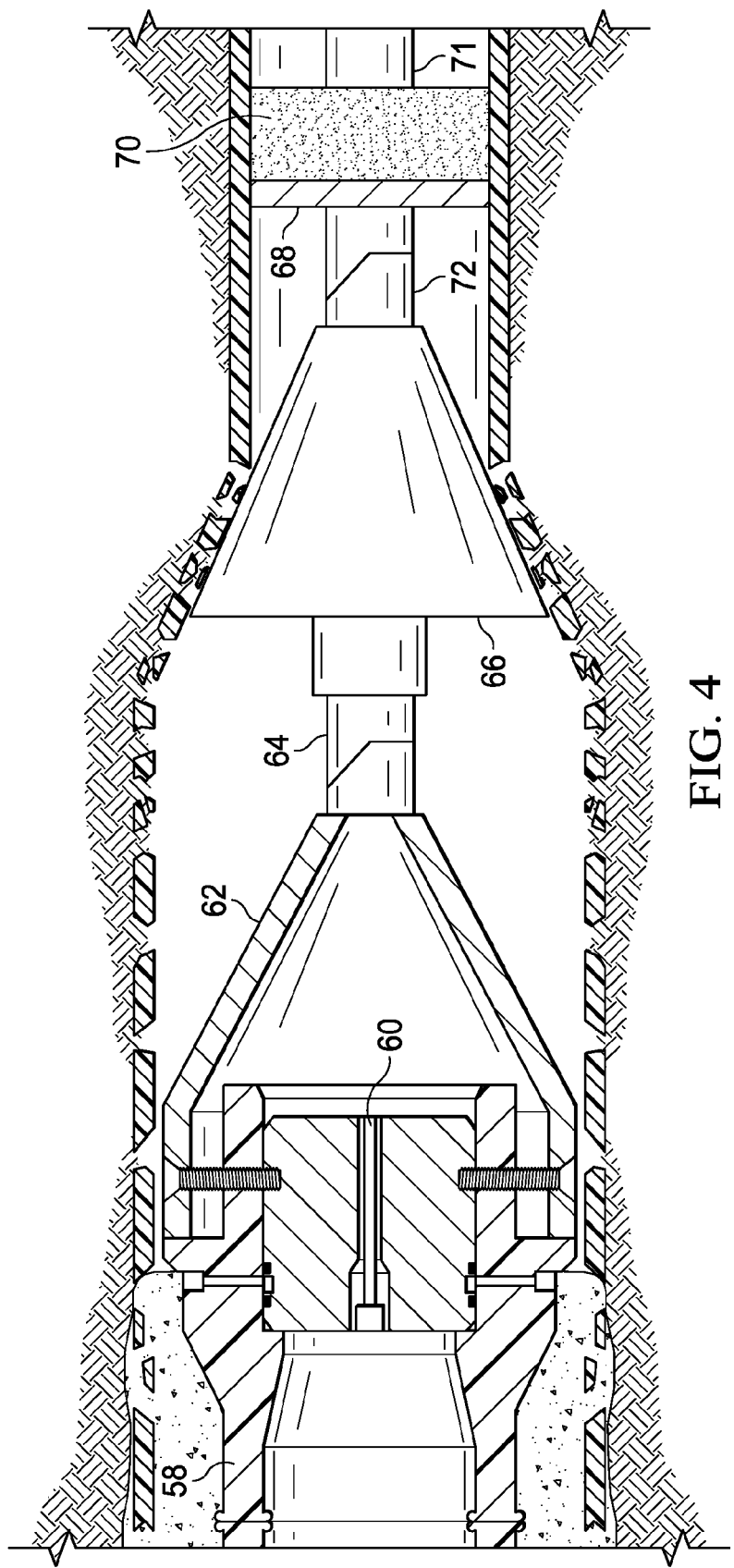
FIG. 4 is a view of another form of bursting and distribution head of the invention shown being used with a forward foam pig.

FIG. 4 shows one version of a distribution head of the invention which includes such forward feed capabilities. In the example shown, the HDPE distributor head 58 is provided with a forward flow port 60 positioned in an aluminum distribution insert inside the HDPE distributor head 58. The forward flow port 60 communicates with the interior of the expander head 62.

The expander head 62 is attached by means of pull rods 64 to the conical pipe splitter 66. The pipe splitter 66 is attached to a pig push plate 68 which acts on a foam pig 70. The pipe splitter is also attached to forwardly extending pull rods 71. The foam pig 70 is typically made of open cell polyurethane foam. The function of the pig is to seal the internal areas of the pipeline to allow for pressurization and to push fluid into the surrounding soils. The internal flow arrangement allows the fluid to flow forward to pressurize the forward pig 70. In other words, the encapsulant media flows through the expander head, through the pipe splitter and through flow ports 72 behind the pig push plate 68.

Figure 5:
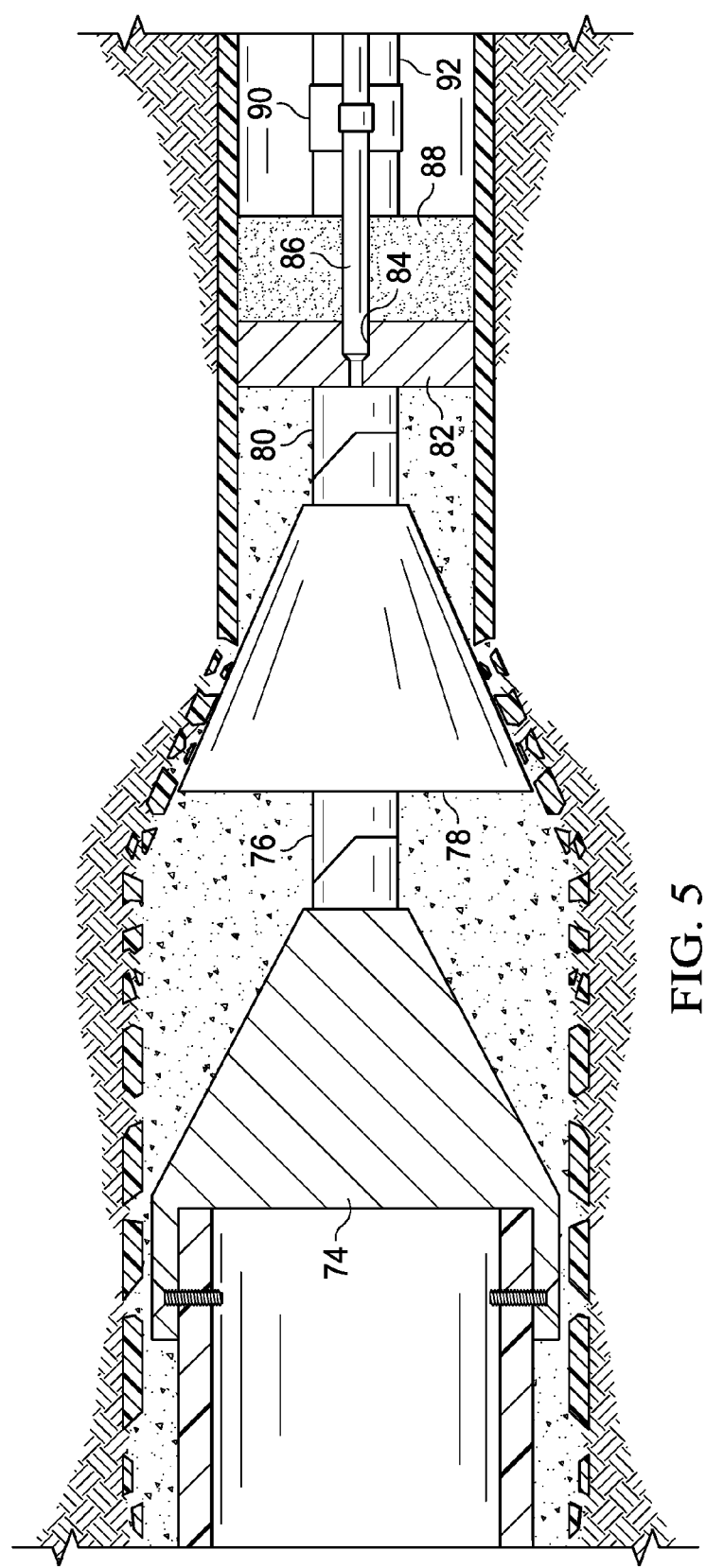
FIG. 5 is yet another form of the bursting and distribution head of the invention in which a hose delivers the encapsulating media in front of the expander head.

FIG. 5 shows another version of a distribution and bursting head with forward flow capabilities. In this case, the expander head 74 is attached by pull rods 76 to the pipe splitter 78. The pipe splitter 78 is attached by pull rods 80 to a specially designed pig push plate 82 which is equipped with a hose connection 84 for a fluid supplying hose 86. A foam pig 88 again seals and pressurizes the fluid in the annular space. A hose clip 90 connects the hose to the forwardly extending pull rods 92. Thus, in this case, the hose 86 is coupled to the pipe bursting pull rods 92 and communicates fluid media through the customized pig plate 82 to pressurize and allow flow from a forward position.

An invention has been provided with numerous advantages. The insertion pipe (metal or plastic) requires bedding to provide proper embedment support around the pipe to carry vertical soil pressure without flattening or ovality of the pipe 'hoop'. With pipe bursting, the injected annular viscous fluid is designed to become firm, and take a 'set', and harden. This occurs prior to siltation collapse of the annular temporarily enlarged 'soil tunnel' created by the pipe-bursting metal enlarging head. Applicant's claimed process provides embedment and proper support of the replacement pipe by a flowable fill of an injectable fluid with stiffening and hardening and solidification characteristics, creating an annular fill around the replacement pipe to provide recommended support required by all pipes and pipe manufacturers for buried pipe.

Applicant's process provides for the injection of a flowable fill of designated viscosity, density and material composition, creates buoyancy of the replacement pipe, thus significantly decreasing the net pipe weight per foot, and decreasing the effective frictional drag-load, thus making longer length pipe pulls possible.

When the annular cylinder around the replacement pipe is not filled, the fragments from the action of pipe bursting can drop under the influence of gravity, sooner or later, and impinge on the replacement pipe. No pipe manufacturer recommends point impingement on their pipe, quite to the contrary. In Applicant's process, as the annulus becomes filled with flowable fill, the injected annular matrix material supports the pipe fragments by viscosity and buoyant action, such that the nature of any possible impingement is mitigated. Point load on the replacement pipe is minimized or eliminated.

In some soil locations where chemical or hydrocarbon contamination of the soil exists, replacement pipes are otherwise exposed to chemical 'attack' or exposure. In 'Super Fund' hazardous waste sites, quite often, impermeable clay vertical ° walls' are cut and vertically injected into the ground to confine or stop chemical migration. Applicant's process allows for the use of resistant or impermeable injectable clays, or other flowable fill materials injected in the annulus left by the action of pipe bursting, so as to protect and isolate the replacement pipe from hazardous chemical exposure.

The flowable fill used in Applicant's process can also be modified to mitigate the aggressive and corrosive nature of the native soil adjacent to the replacement pipe. The flowable fill can be formulated so as to be non-aggressive and non-corrosive to the replacement pipe. More specifically, the annular flowable fill can be formulated to be chemically compatible for contact with the replacement pipe, and also, isolate the replacement pipe from aggressive and chemically corrosive native soils.

Based upon viscosity, formulation and material ingredients, the injectable flowable fill used in the process of the invention can be very fluid with low viscosity, or can be very 'thick' and viscous with very high viscosity, all the way up to a sludge consistency. With the annular flowable fill compositions used in the method of the invention, the viscosity, constituents, fillers, and formulation viscosity can be regulated so as to 'seal off' tight sands, or seal off 'loose gravels', so as to insure annular fill without 'run-away' of the flowable fill radially into the native soil, away from the replacement pipe, and, to maintain a desired annular pressure during annular injection to insure complete annular fill and encapsulation of the replacement pipe and burst fragments of the host pipe.

The flowable annular fill compositions used in the practice of the invention can even be low or high strength cementitious materials (mortar or concrete). The annular flowable fill can be any injectable material suitable for the pipe project requirements, without restriction to composition or formulation.

The preferred MEM compositions which are to be described are thus useful in a variety of in-situ pipeline rehabilitation and replacement technologies, typically implemented by but not limited to: axial pipe-bursting, pipe slitting or splitting, or pipe fracturing. The new pipe which is being pulled into place to replace the burst asbestos pipe will typically be a plastic, such as polyethylene or PVC, but the principles of the invention could also find applicability in processes where the new pipe being installed is fiberglass, ductile iron, cement, clay-tile, concrete, and the like.

In its preferred form, the MEM formulation is a safe, non-toxic, adhesive geo-encapsulation compound formulated using several blended interactive and/or reactive ingredients, tailored to achieve desired physical properties for specific soils and ground conditions. No single MEM formulation is practical for all soils and embedment conditions. Because the existing soils and pipeline bedding conditions across the North American continent vary significantly, the baseline MEM formulation must be tailored and modified for each soil type and ground condition, to provide the desired macro-encapsulation and immobilization of asbestos-cement pipe fragments and, when present, friable fibers derived from fractured asbestos-cement pipe surfaces. The pressurized and pumped fluid formulation surrounds the asbestos cement fragments and any released asbestos fibers, and, the MEM formulation effectively penetrates further into the local native soil, engulfing all local material within an effective radial perimeter, thus macro-encapsulating the combined fragmented host-pipe's debris, and a radial layer of soil, as well as colorizing it all to some degree for identification. MEM formulations are typically blended at the construction site into a pumpable thixotropic fluid which is injected simultaneously into both the annulus and ground during the pipe bursting process, and which later solidifies.

When tailored for soil types with respect to grain size and shape, particle size distribution, mineral composition, and inter-granular porosity, the MEM formulation can be pressure injected at the appropriate viscosity to penetrate sufficiently around fragmented pipe debris and into the surrounding soil mass. At the appropriate viscosity and chemical composition, injection stability (without 'run-away') is therefore maintained so as to provide the nominal penetration distance beyond the zone of encapsulated and embedded asbestos cement fragments and fibers.

The MEM formulation is also preferably infused with a unique blend of integral colorants which can include mineral oxide pigments, metal di-oxide pigments, and Quinacridone Violet Dyes, triarylmethane dyes (Methyl Violet 10B) to produce a distinctive, internationally accepted visual coloration identifier utilized to recognize AC Pipe Encapsulation. The injected annulus' circumferential layer of material surrounding the new pipe becomes infused with this generally purple/violet color identifier (or user specified color) so as to be readily identified if uncovered. The annular flowable fill can be color coded for various purposes, such as to indicate specific replacement pipe use, when excavated and exposed. The colored flowable fill can also be used to indicate remaining fragments of asbestos cement pipe.

The MEM formulation provides in-situ ground improvement in solidity, cohesiveness, and strength by filling the void space between soil particles, rocks, asbestos fibers if present, and fragments of AC pipe wall. In essence, the host AC pipe is fluidly macro-encapsulated in-situ, in a closed subterranean space, into a solidified, continuous, irregular mass.

Specific admixture ingredients can modify the basic formula with non-ionic surfactant emulsifiers so that the fluid exhibits an affinity for the soil types and entrained objects, so the surface tension differential is lowered to enable and maximize cohesive adhesion and encapsulation.

The MEM formulation develops into a solidified asbestos-cement fiber/fragment encapsulation with radial ground penetration, thus converting the previously discrete annulus and circumferential layer of soils into a cohesive mass surrounding the new pipe.

Controlled MEM formulations provide medium early strength with early solidification, prevents liquids-solids segregation by pressure filtration, prevents dilution by subterranean water presence or flow thru soils, and develops appropriate early strengths by initial solidification and follow-on densification.

The "set-time" of the MEM medium can be regulated by set-retarding or set-accelerating admixture ingredients, to allow pumping long pipeline distances through small diameter supply hoses (lowered viscosity and longer set time), or, to set up quickly in the presence of groundwater (to prevent ingredient dilution and/or segregation).

The MEM formulation range includes use of superplasticizers which improve flowability and compound consolidation without requiring any external vibration. It becomes a self-consolidating compound which is non-segregating.

While the invention has been shown in several of its forms, it is not thus limited, but is susceptible to various changes and modifications without departing from the spirit thereof.

What is claimed is:

1. A method for macro-encapsulating friable and non-friable asbestos fibers generated from asbestos cement pipe during a pipe bursting operation where a replacement pipe is also being installed, the method comprising the steps of:

providing a flowable fill for forming an in-situ layer of a temporarily fluid macro-encapsulating material which absorbs and immobilizes asbestos fibers and pipe fragments, the macro-encapsulating material being applied simultaneously as the pipe bursting operation proceeds;

providing a distribution head for receiving the macro-encapsulating material while simultaneously pulling the replacement pipe, the macro-encapsulation material being injected through a plurality of radially arranged injection ports formed in a circumferential pattern at a selected location on the distribution head into an annular region formed about the distribution head and replacement pipe, thus pressurizing the annular region, and wherein the distribution head includes a burst head for bursting the asbestos cement pipe, and wherein the injection ports are located forward of the burst head so as to pre-fill the asbestos cement pipe prior to pipe bursting, such that upon rupture and fragmentation, the pipe fragments are pre-wetted by the macro-encapsulating material;

the macro-encapsulating material forming an in-situ layer around the replacement pipe being laid in the pipe bursting operation, whereby the macro-encapsulating material envelops the asbestos pipe fragments and fibers and co-mingles with exposed native soil and solidifies, achieving full circumferential encapsulation of the asbestos fibers and pipe fragments at the location of the injection ports, thus preventing the fibers and pipe fragments from later becoming air-borne;

wherein the pipe bursting operation causes an action of shock and vibration, and wherein the action of shock and vibration of the pipe bursting operation forces liquefaction of exposed soil into the temporarily fluid macro-encapsulation material, thereby creating a continuous bonded mass of macro-encapsulation material, pipe fragments and asbestos fibers which are co-bonded with a thin layer of the exposed soil.

2. The method of claim 1, wherein the macro-encapsulation material includes components selected from the group consisting of water, cements, plasters, bentonite, reactive polymers or polymer mixtures, foams, surfactants, wetting agents bonding agents, forming agents, minerals, or chemicals which chemically react with asbestos fibers to destroy the asbestos fibers and other such elements mixtures or compounds which work to absorb and bind together soil and fragmented asbestos pipe debris.

3. The method of claim 2, wherein the macro-encapsulation mixture has a measurable viscosity and density and wherein the method for macro-encapsulating the friable and non-friable asbestos fibers includes the step of varying the macro-encapsulation mixture, whereby the macro-encapsulation mixture can be varied by varying ingredients which are used in making up the macro-encapsulation mixture, as well as controlling the viscosity and density of the mixture to achieve macro-encapsulation.

4. The method of claim 2, wherein the method uses macro-encapsulation materials which are tailored for use with differing soils types around asbestos cement pipe in various geographical locations across the USA and the world globe.

5. The method of claim 1, wherein the macro-encapsulation material has characteristic physical properties and wherein the characteristic physical properties are adjustable to provide targeted viscosity, to provide soil penetration into various soil types, to minimize solids segregation by pressure filtration, to minimize dilution and/or segregation by subterranean water, and, to regulate set-time fee.

6. The method of claim 1, wherein selected characteristics of the flowable fill used in the method provide needed bedding to provide proper embedment support around the replacement pipe being installed to carry vertical soil pressure without flattening or ovality of the pipe while also providing proper support of the replacement pipe by the flowable fill of an injectable fluid which has stiffening and hardening and solidification characteristics that create an annular fill around the replacement pipe.

7. The method of claim 1, wherein injection of the flowable fill of designated viscosity, density and material composition, creates buoyancy of the replacement pipe.

8. The method of claim 1, wherein an annulus is created around the replacement pipe, and wherein as the annulus becomes filled with flowable fill, and wherein the macro-encapsulating material in the flowable fill supports pipe fragments created during the pipe bursting operation by viscosity and buoyant action, such that the nature of any possible point impingement on the replacement pipe is mitigated.

9. The method of claim 1, further comprising the use of resistant or impermeable injectable clays, or other flowable fill materials injected in the annulus left by the action of pipe bursting, so as to protect and isolate the replacement pipe from hazardous chemical exposure.

10. The method of claim 1, wherein the flowable fill which is utilized contains macro-encapsulating materials which mitigate the aggressive and corrosive nature of native soil adjacent to the replacement pipe.

11. The method of claim 1, wherein the flowable fill encapsulating materials which are used are effective to seal off tight sands, or loose gravels, so as to insure annular fill without run-away of the flowable fill radially into surrounding soil, away from the replacement pipe.

12. The method of claim 1, wherein the flowable fill is comprised at least in part of low or high strength cementitious materials, including mortar and concrete.

\* \* \* \* \*

UNITED STATES PATENT AND TRADEMARK OFFICE
CERTIFICATE OF CORRECTION

Page 1 of 1

PATENT NO. : 9,829,143 B2
APPLICATION NO. : 15/153528
DATED : November 28, 2017
INVENTOR(S) : Edward Alan Ambler and Samuel James Boyd It is certified that error appears in the above-identified patent and that said Letters Patent is hereby corrected as shown below:

On the Title Page

Item (72) please insert Co-Inventor:
--Samuel James Boyd
3206 Fernoaks Drive
Spring, Texas 77388
US--

Signed and Sealed this
Twenty-ninth Day of December, 2020

Andrei Iancu
*Director of the United States Patent and Trademark Office*